United States Patent [19]

Knothe et al.

[11] Patent Number: 4,719,980
[45] Date of Patent: Jan. 19, 1988

[54] ANALYTICAL BALANCE WITH SCALE ON TOP AND WITH WEIGHING CHAMBER LOCK

[75] Inventors: Erich Knothe, Eddigehausen; Franz-Josef Melcher, Hardegsen; Klaus Dardat, Dransfeld; Günther Maaz, Uslar, all of Fed. Rep. of Germany

[73] Assignee: Sartorius GmbH, Fed. Rep. of Germany

[21] Appl. No.: 946,016

[22] Filed: Dec. 24, 1986

[30] Foreign Application Priority Data

Jan. 18, 1986 [DE] Fed. Rep. of Germany ....... 3601408

[51] Int. Cl.$^4$ ............................................. G01G 21/28
[52] U.S. Cl. ..................................... 177/180; 177/238
[58] Field of Search ............................... 177/180–182, 177/238–243

[56] References Cited

U.S. PATENT DOCUMENTS 4,465,152 8/1984 Schmitter ............................ 177/180
4,664,207 5/1987 Knothe et al. ...................... 177/181

Primary Examiner—George H. Miller, Jr.
Attorney, Agent, or Firm—Eric P. Schellin

[57] ABSTRACT

In an analytical balance with scale on top with a scale carrier which is directly operatively connected to the measured value receiver, with a balance scale disk (6) which rests in a removable manner on the scale carrier, with a weighing chamber which surrounds the balance scale disk (6), the scale carrier and the measured value receiver, with a weighing chamber lock which constitutes the communication between the weighing chamber and the environment and which consists of two sets of closing doors or elements located in a vertically displaced manner in the form of a lock and with a transport device which can move the balance scale between a weighing position on the scale carrier and a loading position outside of the weighing position on the scale carrier and a loading position outside of the weighing chamber, the two closing elements of the weighing chamber lock are located above one another. The lower closing element consists of at least one level, horizontal plate which can be shifted in the plate plane. The upper closing element consists of at least one level plate or of a cylindrically bent plate which can be shifted in the plate plane or in the cylinder surface. The transport device for the balance scale disk moves the latter essentially vertically.

6 Claims, 5 Drawing Figures

ANALYTICAL BALANCE WITH SCALE ON TOP AND WITH WEIGHING CHAMBER LOCK

BACKGROUND OF THE INVENTION

The invention is to an analytical balance with a scale on or near the top, with a balance scale reciprocable carrier which is directly operatively connected to the measured value receiver, with a balance scale disk which rests in a removable manner on the scale carrier, with a weighing chamber which surrounds the balance scale, the scale carrier and the measured value receiver, with a weighing chamber lock which constitutes the communication between the weighing chamber and the environment and which consists of two closing doors or elements located one above the other in the form of a lock and with a reciprocable transport device which can move the balance scale between a weighing position on the scale carrier and a loading position outside or at the upper portion of the weighing chamber.

A balance of this type with a weighing chamber lock is seen in DE-AS No. 12 11 809, where it has, however, a scale on the bottom and is combined with a preliminary balance. The lock arrangement there has the function of reducing the creation of air currents to a minimum when the balance scale with the material to be weighed is introduced into the weighing chamber in order that a precise weighing can be performed as quickly as possible. A disadvantage of this known design is the complicated mechanism of the transport device, which must generate a lift motion and a lateral shifting of the balance scale separately from one another.

A weighing chamber lock is also seen in DE-AS No. 10 12 762 for a vacuum balance. The transport device shown here also has a complicated design and the closing elements of the lock in the form of pivotable flaps do result in a good seal for the vacuum, but they generate considerable air currents during opening and closing.

The invention therefore has the object of indicating a weighing chamber lock and a transport device for the balance with the scale disk on top as discussed in the above which requires only an efficient mechanism and which prevents as much as possible the creation of air currents when the balance scale and material to be weighed are passed through the lock.

SUMMARY OF THE INVENTION

The invention achieves this object as follows: The two closing elements of the weighing chamber lock are located above one another, the lower closing element consists of at least one level, horizontal plate which can be shifted in its plate plane. The upper closing element consists of at least one level or arcuately bent plate which can be shifted in the plate plane or in the cylinder surface and the transport device for the balance scale moves it essentially vertically.

On account of the arrangement of the closing elements of the weighing chamber lock above one another, the balance scale disk must be moved only in one direction, namely vertically. The raising of the balance scale from the scale carrier and the passage through the weighing chamber lock are therefore combined into a straight-line movement. This arrangement also offers the advantage, due to the horizontal closing elements, that the thermal layering of the air is minimally affected by the opening and closing of the closing elements. In contrast thereto, in the case of vertical closing elements according to the state of the art, a compensation current always results on both sides of the closing element when the closing element is opened, and after the closing element is closed, the stationary state must gradually reestablish itself. The closing elements consist with advantage of two plates which meet in the middle and leave a symmetrical slot during opening. In this instance, the slot width can be adapted to the size of the balance scale disk being used by opening to different widths. This is true both for level and also for arcuately bent plates.

In another advantageous embodiment, the closing element is designed like an iris diaphragm and leaves an approximately circular opening free.

The transport device for the balance scale disk can be designed in an especially simple manner if it passes from below through the lower closing element. The lower closing element therefore advantageously comprises a recess on the closing edge, so that an opening is created in the closed state through which parts of the transport device can extend.

It is advantageous if the transport device for the balance scale disk comprises a lifting element guided in parallel motion in order to prevent the balance scale form tipping over during motion.

BRIEF DESCRIPTION OF THE INVENTION

The invention is described in the following with reference made to the schematic figures.

DETAILED DESCRIPTION OF THE INVENTION

Figure 1:
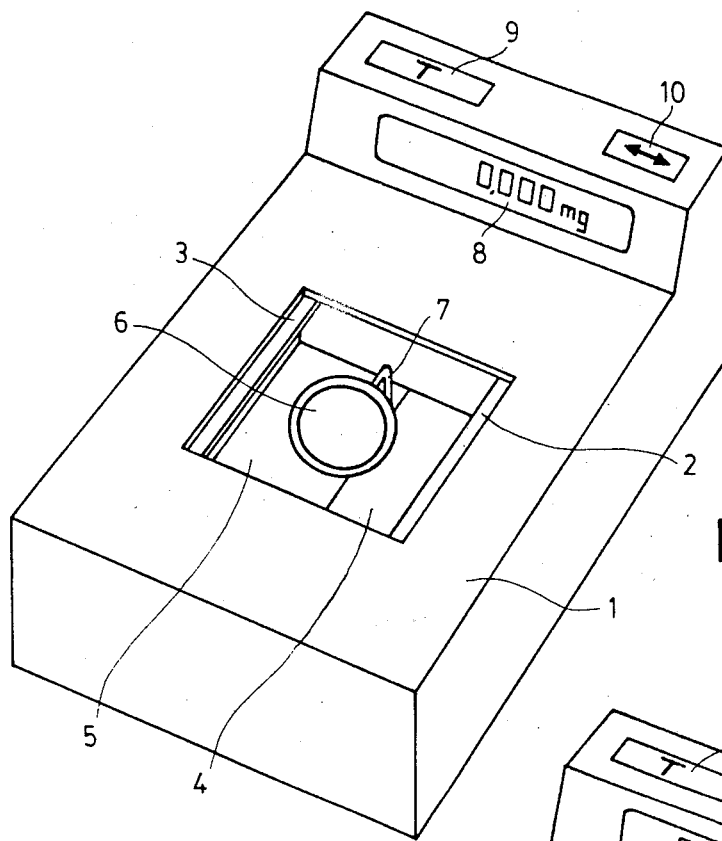
FIG. 1 shows the analytical balance in loading position.
Figure 2:
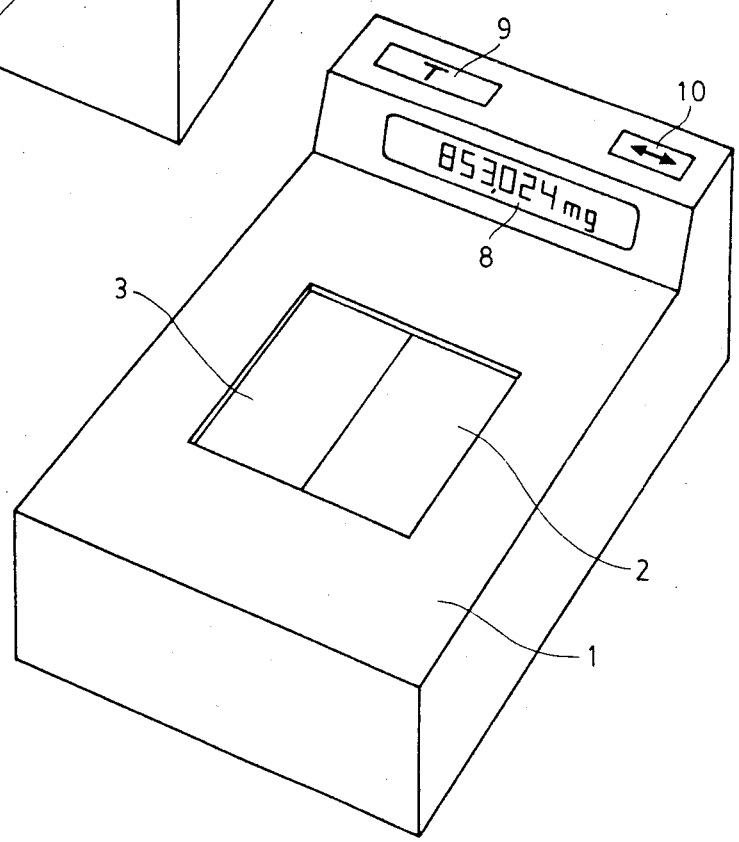
FIG. 2 shows the analytical balance in weighing position.

FIG. 1 shows the analytical balance in a load acceptance position. Both plates 2, 3 of the upper closing element are wide open and balance scale disk 6 is raised by lifting element 7 so far that it is approximately at the level of the upper limiting surface of housing 1 and can be easily lifted off from lifting element 7 with a pair of tweezers or can also be loaded directly with the material to be weighed. It will be seen that lower closing element, consisting of plates 4, 5 are closed. In FIG. 2, two semicircular recesses at the closing edges of plates 4, 5 which are covered in FIG. 1 by balance scale disk 6, permit the passage of the vertical rod of lifting element 7; otherwise, the interior of housing 1 with the measuring system is hermetically closed. FIG. 1 also shows measured value display 8, tare key 9 and key 10 for the electrical release of the lifting movement of the balance scale and the opening and closing of the closing elements of the weighing chamber lock.

Figure 4:
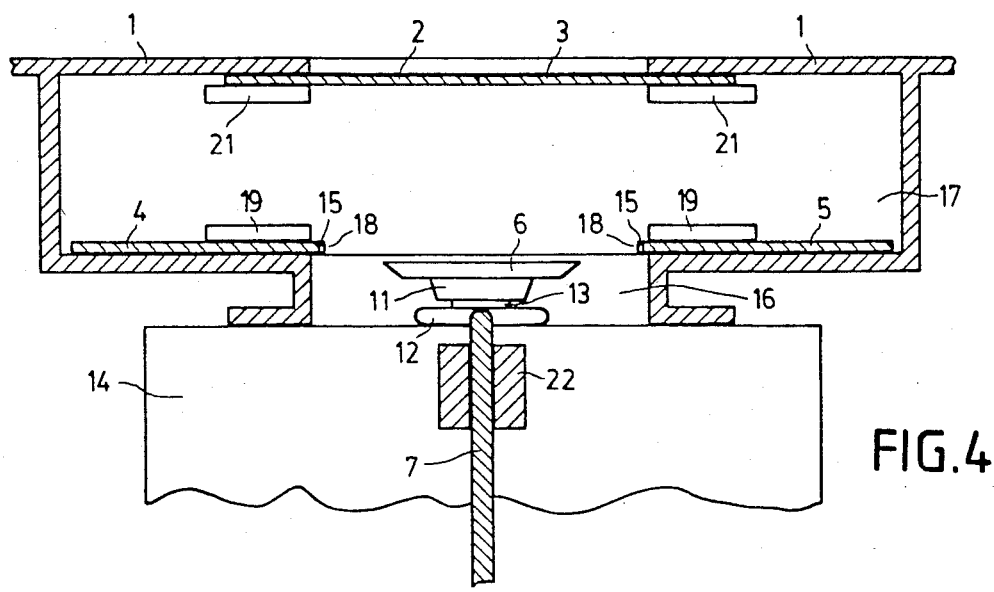
FIG. 4 shows a section through the weighing chamber lock in weighing position.

FIG. 2 shows the same analytical balance in the weighing position. The upper closing element consisting of plates 2, 3 is closed and blocks the view onto the balance scale disk, the measuring system and the lower closing element. As shown in FIG. 4 in this weighing position, the lower closing element is open and the balance scale disk is no longer resting on the lifting element but rather on the scale carrier. Display 8 shows the weighing result in digital form.

FIG. 4 shows the interior of the balance in this weighing position. FIG. 4 is a section through the analytical balance of FIGS. 1 or 2. This section is placed so that it passes right through the vertical rod of lifting element 7; the section is shown from the rear so that balance scale disk 6 can be discerned. Balance scale disk 6 rests on scale carrier 13 of measured valued receiver 14. (The measured value receiver can operate according to any measuring system with few paths; its operation is not essential for the invention and is therefore not explained in detail.) Balance scale disk 6 is centered on scale carrier 13 by ring 11 on the bottom of balance scale disk 6. Lifting element 7 with its receiving ring 12 is not operatively connected to balance scale disk 6. The lower closing element consisting of the two plates 4, 5 shown in FIG. 4 as being open and the upper closing element consisting of the two plates 2, 3 shown or being closed.

Figure 3:
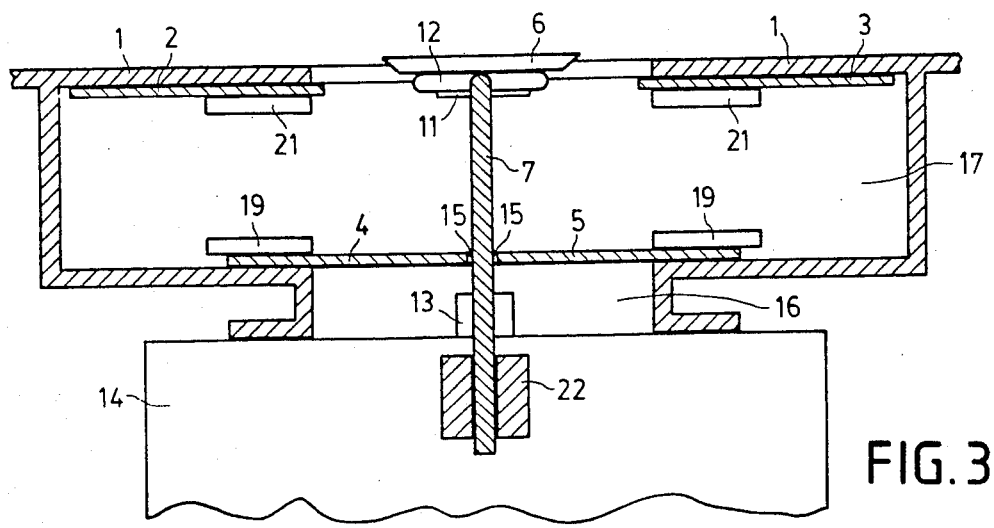
FIG. 3 shows a section through the weighing chamber lock in loading position.

The lifting off of balance scale disk 6 and the passage through the weighing chamber lock then occur as follows: Lifting element 7, which is guided in parallel motion in bushing 22, raises balance scale disk 6, whereby ring 11 is centered on the bottom of balance scale disk 6 in receiving ring 12 of the lifting device. As soon as the bottom of receiving ring 12 has reached the level of the two plates 4, 5, the two plates move toward each other until they meet in the middle and separate weighing chamber 16 from lock space 17. (A passage opening is left free thereby for vertical rod 7 of the lifting device by means of two semicircular recesses 15 on closing edges 18.) Then, the two plates 2, 3 of the upper closing element move away form each other and free the opening for the balance scale. Lifting element 7 moves further upward until it finally reaches its uppermost position approximately at the level of the upper edge of the housing, which is shown in FIG. 3.

Upper plates 2, 3 are guided in a groove between housing 1 and ridges 21. Ridges 19 create a groove for lower plates 4, 5 in a corresponding manner. The mechanism for moving plates 2, 3 and 4, 5 and lifting element 7 has been omitted in FIGS. 3, 4 for the sake of clarity. Since a simple, straight-line motion is involved in all instances, this mechanism can be easily created by any expert in the art. For example, lifting rod 7 can be raised directly by an eccentric. The mechanism can be moved either by an electromotor (as is indicated in FIGS. 1, 2 by key 10) or by an external operating element (e.g. a knurled turning knob) by hand. Another possibility which would be easy to create would be to open the closing elements only partially in the case of small balance scales.

It is likewise readily possible for an expert in the art to derive other embodiments from the embodiment shown, in which each closing element consists of two plates, e.g. with one appropriately larger plate or with 4 plates, each of which covers a quadrant and which meet in the middle or with a closing element in the form of an iris diaphragm.

Figure 5:
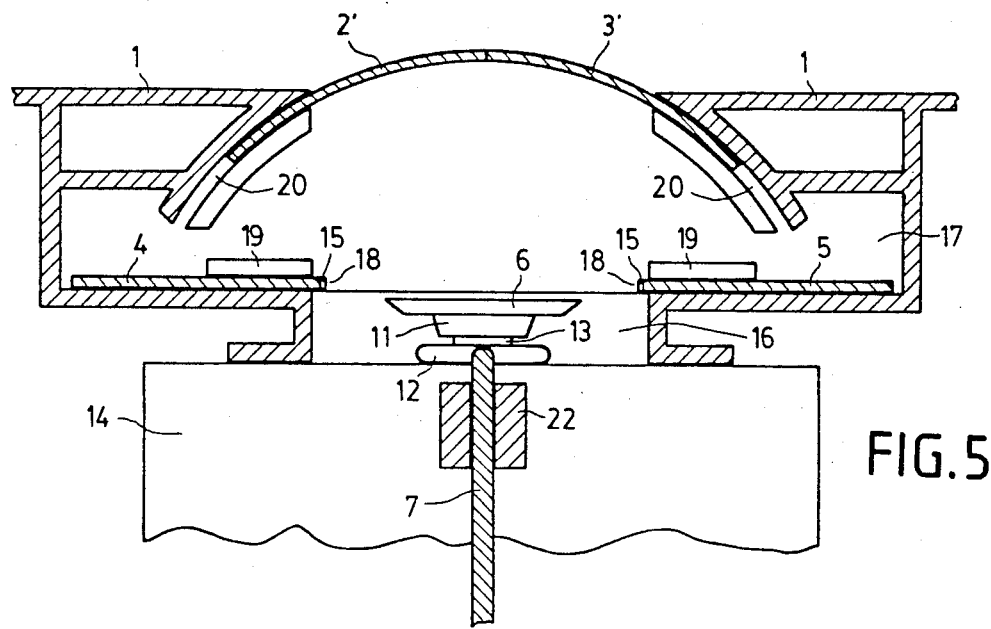
FIG. 5 shows a section through the weighing chamber lock in weighing position in another embodiment.

FIG. 5 shows another embodiment of the analytical balance in section. The presentation corresponds to that of FIG. 4 and identical parts have the same reference numerals. In this embodiment, the upper closing element of the weighing chamber lock consists of two cylindrically arcuate plates 2', 3'. For opening, both arcuate plates can be pivoted to the side. The arcuate plates are guided, for example, by circular grooves 20 in housing 1 on the front and rear ends. This embodiment agrees in the other details with the embodiment of FIG. 4.

We claim:

1. Analytical balance with scale on top with a scale carrier which is directly operatively connected to a measured value receiver, with a balance scale disk which rests in a removable manner on the scale carrier, with a weighing chamber which surrounds the balance scale disk, the scale carrier and the measured value receiver, with a weighing chamber lock which constitutes the communication between the weighing chamber and the environment and which consists of two closing elements located in series in the form of a lock and with a transport device which can move the balance scale between a weighing position of the scale carrier and a loading position outside of the weighing chamber, characterized in that the two closing elements 4, 5 and 2, 3 or 2', 3,' of the weighing chamber lock are located above one another, that the lower closing element consists of at least one level, horizontal plate (4,5) which can be shifted in the plate plane, that the upper closing element consists of at least one level plate (2,3) which can be shifted in a plane and that the transport device (7,12) for the balance scale moves the latter essentially vertically.

2. Analytical balance with scale on top according to claim 1, wherein the closing elements consist of two sets of plates (2,3 and 4,5) each set being vertically displaced from each other.

3. Analytical balance with scale on top according to claim 1, wherein the closing elements have the form of an iris diaphragm.

4. Analytical balance with scale on top according to claim 1, wherein the lower closing element (4,5) comprises a recess (15) on the closing edge (18) so that an opening is created in the closed state through which parts of the transport device (7) can extend.

5. Analytical balance with scale on top according to claim 4 wherein the transport device for the balance scale disk (6) comprises a lifting element (7) guided in parallel motion.

6. Analytical balance with scale on top according to claim 1 wherein the upper closing elements are arcuate configuration.

* * * * *